(12) United States Patent
Martinez

(10) Patent No.: US 11,577,608 B2
(45) Date of Patent: Feb. 14, 2023

(54) DASHBOARD COVER SHEET

(71) Applicant: Manuel Martinez, Miami, FL (US)

(72) Inventor: Manuel Martinez, Miami, FL (US)

( * ) Notice: Subject to any disclaimer, the term of this patent is extended or adjusted under 35 U.S.C. 154(b) by 36 days.

(21) Appl. No.: 17/412,611

(22) Filed: Aug. 26, 2021

(65) Prior Publication Data
US 2022/0080833 A1  Mar. 17, 2022

Related U.S. Application Data

(60) Provisional application No. 63/077,136, filed on Sep. 11, 2020.

(51) Int. Cl.
*B60K 37/04* (2006.01)
*B60R 13/02* (2006.01)

(52) U.S. Cl.
CPC .......... *B60K 37/04* (2013.01); *B60R 13/0256* (2013.01)

(58) Field of Classification Search
CPC .............................. B60K 37/04; B60R 13/0256
See application file for complete search history.

(56) References Cited

U.S. PATENT DOCUMENTS

| | | | | |
|---|---|---|---|---|
| 4,560,245 A * | 12/1985 | Sarver | ...................... | B60J 11/08 160/DIG. 3 |
| 4,708,388 A * | 11/1987 | Zacharczuk | .......... | B60J 1/2091 116/28 R |
| 5,038,844 A * | 8/1991 | Edmonds | ................. | B60J 11/08 160/370.21 |
| 5,100,194 A * | 3/1992 | Decker | .................. | B60J 1/2011 160/370.21 |
| 5,156,433 A * | 10/1992 | Decker | ................. | B60J 1/2011 160/370.21 |
| D467,117 S * | 12/2002 | Guy | ...................... | A47D 5/006 D6/596 |
| 7,500,278 B2 * | 3/2009 | Leach | .................. | A47D 15/003 5/655 |
| 9,016,755 B2 * | 4/2015 | Ein | .......................... | B60J 11/08 296/95.1 |
| 2007/0277321 A1 * | 12/2007 | Leach | .................... | A47D 5/006 5/655 |

FOREIGN PATENT DOCUMENTS

| | | | | |
|---|---|---|---|---|
| AU | 2019100745 A4 | * | 8/2019 | ............. B60K 37/04 |
| CN | 205819305 U | * | 12/2016 | ............. B60R 13/02 |
| DE | 202012104960 U1 | * | 5/2014 | ............. B60K 37/04 |
| KR | 200349191 Y1 | * | 5/2004 | |
| KR | 102124731 B1 | * | 6/2020 | |

* cited by examiner

*Primary Examiner* — Lori L Lyjak
(74) *Attorney, Agent, or Firm* — Ruben Alcoba, Esq.

(57) ABSTRACT

A dashboard cover sheet that comprises of a central rectangular sheet that is made of an absorbent material and the length is configured to cover a full length of a dashboard of a vehicle. A first rectangular strip that is made of an impermeable material, the first rectangular strip is affixed to an upper side of the central rectangular sheet. A second rectangular strip that is made of an impermeable material, the second rectangular strip is affixed to the central rectangular sheet. A first absorbent rope that is attached to the first rectangular strip. And, a second absorbent rope that is attached to the second rectangular strip, the first absorbent rope and the second absorbent rope are configured to be placed between the front window of the vehicle and the edges of the dashboard of the vehicle.

4 Claims, 4 Drawing Sheets

DASHBOARD COVER SHEET

CROSS REFERENCE

This application claims priority to and the benefit under 35 U.S.C. section. 119(e) of U.S. Provisional Patent Application No. 63/077,136, filed on Sep. 11, 2020, titled "DASHBOARD COVER SHEET," the entire disclosure of which is hereby incorporated herein by reference.

BACKGROUND

The present invention is directed to a sheet that covers a dashboard when a window tint is installed on a vehicle.

When a window tint is installed on a front window of a vehicle, copious liquid is sprayed over the window tint. The liquid tends to land on the dashboard or go into a channel that separates the window and the dashboard. When this happens, damage occurs to the vehicle's dashboard.

The damage that occurs to the vehicle's dashboard is that the vehicle's dashboard swells or deteriorates into an unsightly condition or that a computer that is placed under the dashboard is ruined.

The dashboard cover sheet of the present invention minimizes the occurrence of the above damage.

For the foregoing reasons, there is a need for a dashboard cover sheet that prevents damage to the dashboard of a vehicle when a window tint is installed.

SUMMARY

The present invention is directed to a dashboard cover that is used to cover the dashboard of a vehicle when the front window of a vehicle is tinted.

The dashboard cover sheet comprises of a central rectangular sheet that is made of an absorbent material and the length is configured to cover a full length of a dashboard of a vehicle. A first rectangular strip that is made of an impermeable material, the first rectangular strip is affixed to an upper side of the central rectangular sheet. A second rectangular strip that is made of an impermeable material, the second rectangular strip is affixed to the central rectangular sheet. A first absorbent rope that is attached to the first rectangular strip. And, a second absorbent rope that is attached to the second rectangular strip, the first absorbent rope and the second absorbent rope are configured to be placed between the front window of the vehicle and the edges of the dashboard of the vehicle.

The sheet is used by placing the absorbent rope between the front window of a vehicle and the dashboard of the vehicle and placing the impermeable material over the dashboard.

An object of the present invention is to prevent damage to the dashboard of a vehicle when a window tint is placed on the window vehicle.

Another object of the present invention is to prevent water damage to the dashboard of the vehicle when a window tint is placed on the window of the vehicle.

DRAWINGS

These and other features, aspects, and advantages of the present invention will become better understood with regards to the following description, appended claims, and drawings where:

DESCRIPTION

Figure 1:
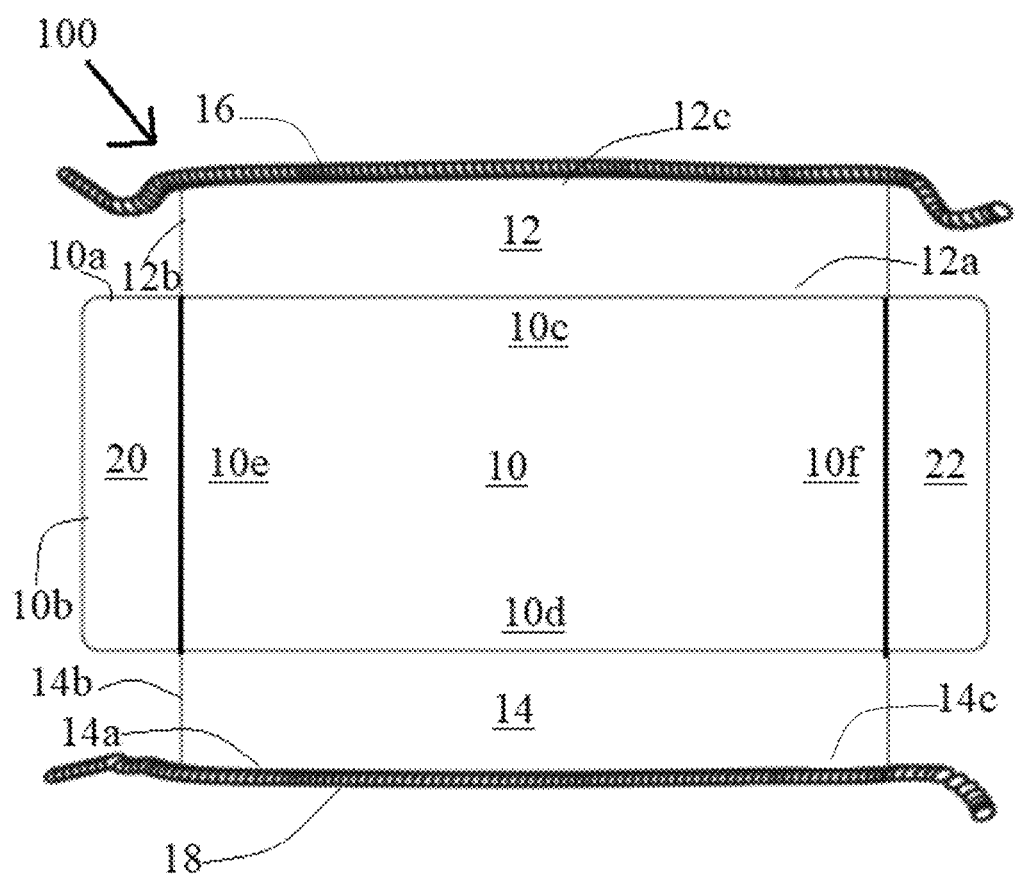
FIG. 1 is a top plan view of the present invention.
Figure 2:
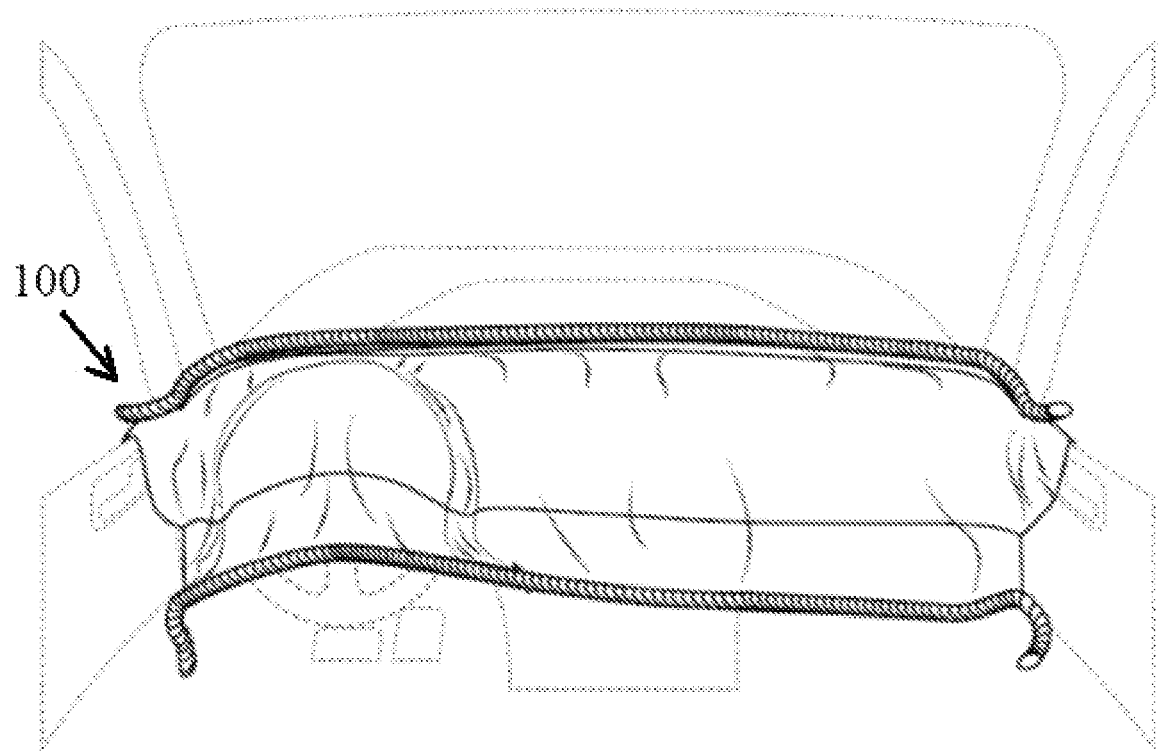
FIG. 2 is a perspective view that shows how the present invention is placed over the dashboard of a vehicle.
Figure 3:
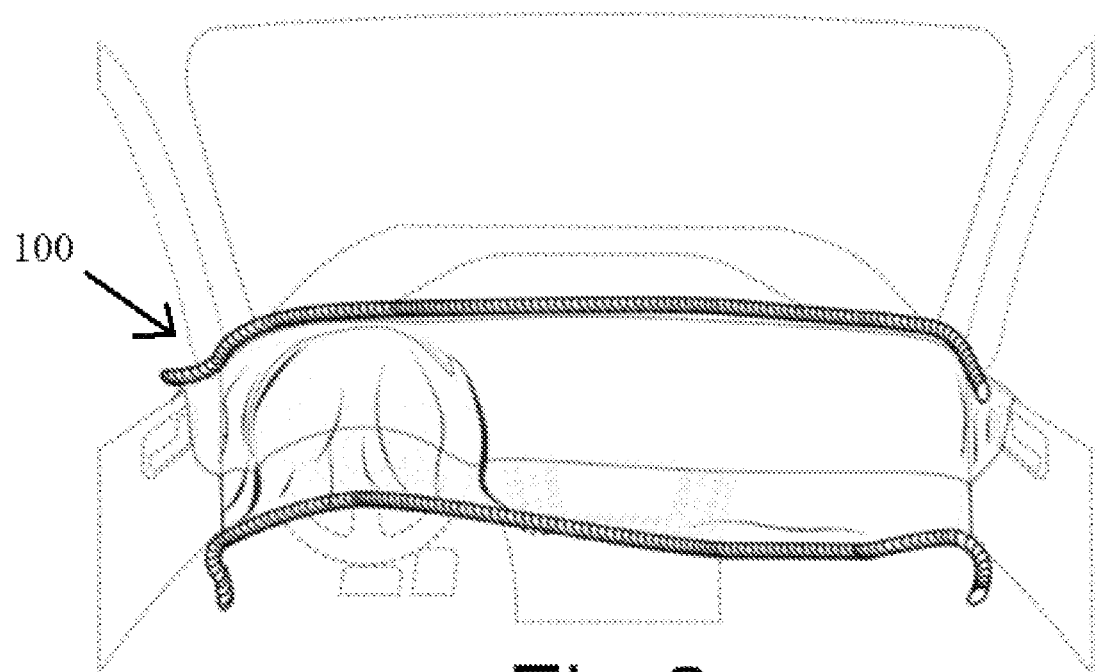
FIG. 3 is a perspective view that shows how the left and right wings of the present invention rest when the present invention is placed over the dashboard of a vehicle.
Figure 4:
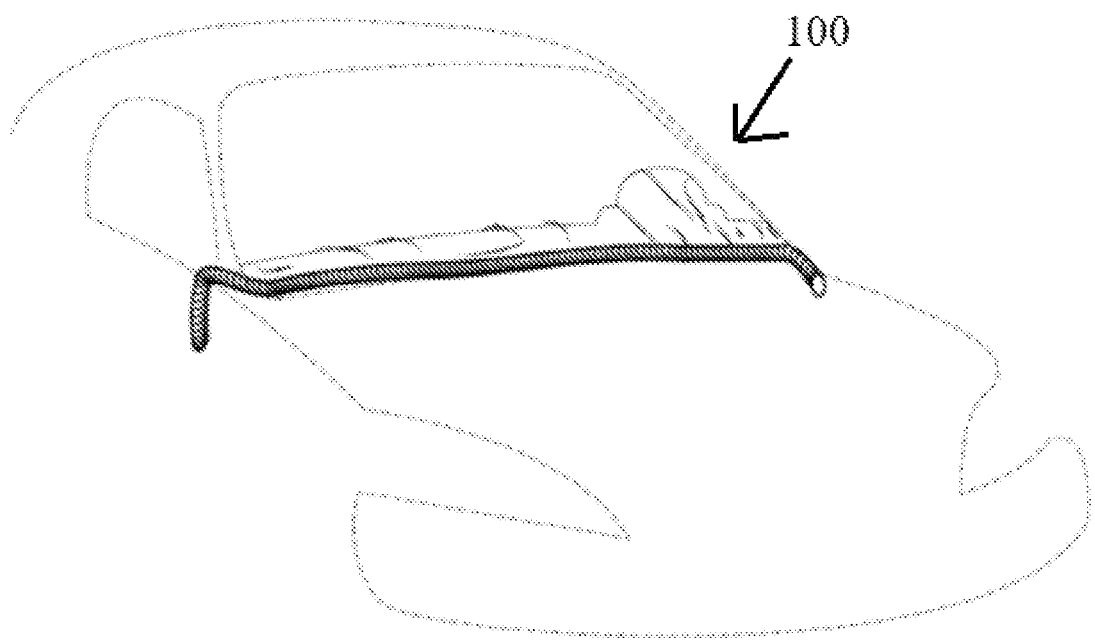
FIG. 4 is another perspective view that shows how the present invention is placed over a dashboard of a vehicle.

As seen in FIGS. 1-4, the present invention is a dashboard cover sheet 100 that is used to protect the dashboard of a vehicle when the front windows of the vehicle are tinted.

The dashboard cover sheet 100 comprises: a central rectangular sheet 10 that has a length 10a and a width 10b, the central rectangular sheet 10 is made of an absorbent material, the length 10a is configured to cover a full length of a dashboard of a vehicle: a first rectangular strip 12 that has a length 12a and a width 12b, the first rectangular strip 12 is made of an impermeable material, the first rectangular strip 12 is affixed to an upper side 10c of the central rectangular sheet 10 along the length 10a of the central rectangular sheet; a second rectangular strip 14 that has a length 14a and a width 14b, the second rectangular strip 14 is made of an impermeable material, the second rectangular strip 14 is affixed to a lower side 10d of the central rectangular sheet along the length 10a of the central rectangular sheet 10; a first absorbent rope 16 that is attached to the first rectangular strip 12 along the length 12a of the first rectangular strip 12 at an outer section 12c of the first rectangular strip 12; and a second absorbent rope 18 that is attached to the second rectangular strip 14 along the length 14a of the second rectangular strip 14 at an outer section 14c of the second rectangular strip 14, the first absorbent rope 16 and the second absorbent rope 18 are configured to be placed between the front window of the vehicle and the edges of the dashboard of the vehicle. In a preferred embodiment of the present invention, the dashboard cover sheet further comprises of a left rectangular wing 20 that extends outward from a left side 10e of the central rectangular sheet 10 and a right rectangular wing 22 the extends outward from a right side 10f of the central rectangular sheet 10.

In an embodiment of the present invention, the length 12a, 14a of the first rectangular strip 12 and the second rectangular strip 14 is fifty-five inches and the width 12b, 14b of the first rectangular strip 12 and the second rectangular strip 14 is thirteen inches, the length 10a of the central rectangular sheet 10 is fifty-five inches and the width 10b of the central rectangular sheet 10 is seventeen inches, and the left rectangular wing 20 and the right rectangular wing 22 extend outward at least five inches from the central rectangular sheet 10.

In another embodiment of the present invention, the length 12a, 14a of the first rectangular strip 12 and the second rectangular strip 14 is sixty-two inches and the width 12b, 14b of the first rectangular strip 12 and the second rectangular strip 14 is thirteen inches, the length 10a of the central rectangular sheet 10 is sixty-two inches and the width 10b of the central rectangular sheet 10 is seventeen inches, and the left rectangular wing 20 and the right rectangular wing 22 extend outward at least five inches from the central rectangular sheet 10.

An advantage of the present invention is that it prevents damage to the dashboard of a vehicle when a window tint is placed on the window vehicle.

Another advantage of the present invention is that it prevents water damage to the dashboard of the vehicle when a window tint is placed on the window of the vehicle.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the specification, the drawings, and the appended claims and their legal equivalents.

What is claimed is:

1. A dashboard cover sheet that is used to cover a dashboard of a vehicle when window tinting a front window of the vehicle, the dashboard cover sheet comprises of:
    a central rectangular sheet that has a length and a width that is made of an absorbent material, the length is configured to cover a full length of the dashboard of the vehicle;
    a first rectangular strip that has a length and a width, the first rectangular strip is made of an impermeable material, the first rectangular strip is affixed to an upper side of the central rectangular sheet along the length of the central rectangular sheet;
    a second rectangular strip that has a length and a width, the second rectangular strip is made of an impermeable material, the second rectangular strip is affixed to a lower side of the central rectangular sheet along the length of the central rectangular sheet;
    a first absorbent rope that is attached to the first rectangular strip along the length of the first rectangular strip at an outer section of the first rectangular strip; and
    a second absorbent rope that is attached to the second rectangular strip along the length of the second rectangular strip at an outer section of the second rectangular strip, the first absorbent rope and the second absorbent rope are configured to be placed between the front window of the vehicle and the edges of the dashboard of the vehicle.

2. The dashboard cover sheet that is used to cover the dashboard of a vehicle when window tinting a front window of a vehicle of claim 1, the dashboard cover sheet comprises:
    a left rectangular wing that extends outward from a left side of the central rectangular sheet; and
    a right rectangular wing the extends outward from a right side of the central rectangular sheet.

3. The dashboard cover sheet that is used to cover the dashboard of a vehicle when window tinting a front window of a vehicle of claim 2, wherein the length of the first rectangular strip and the second rectangular strip is fifty-five inches and the width of the first rectangular strip and the second rectangular strip is thirteen inches, wherein the length of the central rectangular sheet is fifty-five inches and the width of the central rectangular sheet is seventeen inches, and wherein the left rectangular wing and the right rectangular wing extend outward at least five inches from the central rectangular sheet.

4. The dashboard cover sheet that is used to cover the dashboard of a vehicle when window tinting a front window of a vehicle of claim 2, wherein the length of the first rectangular strip and the second rectangular strip is sixty-two inches and the width of the first rectangular strip and the second rectangular strip is thirteen inches, wherein the length of the central rectangular sheet is sixty-two inches and the width of the central rectangular sheet is seventeen inches, and wherein the left rectangular wing and the right rectangular wing extend outward at least five inches from the central rectangular sheet.

* * * * *